United States Patent
Cernasov

(10) Patent No.: US 9,389,419 B2
(45) Date of Patent: Jul. 12, 2016

(54) NEAR-TO-EYE DISPLAY ARTIFACT REDUCTION SYSTEM AND METHOD

(75) Inventor: Andrei Cernasov, Ringwood, NJ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 1212 days.

(21) Appl. No.: 12/191,467

(22) Filed: Aug. 14, 2008

(65) Prior Publication Data

US 2010/0039353 A1 Feb. 18, 2010

(51) Int. Cl.
*G02B 27/00* (2006.01)
*G02B 27/01* (2006.01)

(52) U.S. Cl.
CPC .......... *G02B 27/0093* (2013.01); *G02B 27/017* (2013.01); *G02B 2027/014* (2013.01); *G02B 2027/0118* (2013.01); *G02B 2027/0187* (2013.01)

(58) Field of Classification Search
CPC ............. G02B 27/0093; G02B 27/017; G02B 2027/0187; G02B 2027/0118; G02B 2027/014; G06F 3/012–3/013
USPC ..................... 345/690–693, 7–9, 87–89, 102; 340/901; 359/630–633
See application file for complete search history.

(56) References Cited

U.S. PATENT DOCUMENTS

| | | |
|---|---|---|
| 4,034,401 A | 7/1977 | Mann |
| 4,048,653 A | 9/1977 | Spooner |
| 4,409,615 A | 10/1983 | McMann, Jr. et al. |
| 4,437,113 A | 3/1984 | Lee et al. |
| 4,532,918 A | 8/1985 | Wheeler |
| 5,287,437 A | 2/1994 | Deering |
| 5,742,264 A | 4/1998 | Inagaki et al. |
| 5,742,332 A | 4/1998 | Imai et al. |
| 5,771,066 A | 6/1998 | Barnea |
| 5,905,525 A | 5/1999 | Ishibashi et al. |
| 5,917,460 A | 6/1999 | Kodama |
| 6,302,541 B1 | 10/2001 | Grossmann |
| 6,593,957 B1 | 7/2003 | Christie |
| 6,734,845 B1 | 5/2004 | Nielsen et al. |
| 6,788,274 B2 | 9/2004 | Kakeya |
| 7,199,934 B2 | 4/2007 | Yamasaki |
| 2006/0033992 A1 | 2/2006 | Solomon |
| 2006/0256140 A1 | 11/2006 | Turner |
| 2007/0091037 A1 | 4/2007 | Lee |
| 2007/0126928 A1* | 6/2007 | Klompnhouwer et al. ... 348/497 |
| 2008/0051946 A1 | 2/2008 | Breed |
| 2008/0122737 A1 | 5/2008 | Lea et al. |

OTHER PUBLICATIONS

EP Search Report dated Jan. 29, 2010, EP09167418.4-2218.

* cited by examiner

*Primary Examiner* — Liliana Cerullo
(74) *Attorney, Agent, or Firm* — Ingrassia Fisher & Lorenz, P.C.

(57) ABSTRACT

A near-to-eye (NTE) display system and method are provided for reducing artifact display in a NTE display that is worn, at least partially, on a viewer's head. The movement of the NTE display is sensed while displaying an image that comprises individual content frames on the NTE display. A characteristic of the individual content frames of the displayed image is varied based on the sensed movement.

10 Claims, 3 Drawing Sheets

NEAR-TO-EYE DISPLAY ARTIFACT REDUCTION SYSTEM AND METHOD

TECHNICAL FIELD

The present invention generally relates to near-to-eye (NTE) displays and, more particularly, to systems and methods for reducing display artifacts in NTE displays.

BACKGROUND

Modern vehicles, such as aircraft, often include head-up displays (HUDs) that project various symbols and information onto a transparent display, or image combiner, through which a user (e.g., the pilot) may simultaneously view the exterior. Traditional HUDs incorporate fixed image combiners located above the instrument panel on the windshield of the aircraft, or directly between the windshield and the pilot's head.

More recently, "head-mounted" HUDs have been developed that include near-to-eye (NTE) display devices. Depending upon the particular end-use environment, these NTE display devices may be coupled to a helmet or headset of viewer, and thus move with the changing position and angular orientation of the viewer's head. This advantageously allows the displayed information to be visible to the viewer regardless of the position or orientation of viewer's head. In many implementations, the NTE display devices, when operating, will generate a virtual image that may appear to be rendered on a remotely located surface within the viewer's field of view. For example, in the context of a vehicle, the virtual image may appear to the viewer to be rendered on the vehicle windshield, floating a distance (e.g., 20 feet) beyond the windshield at a fixed position in space, or floating at infinity but fixed to the environment.

One of the potential drawbacks associated with NTE devices is that the virtual image may fail to "stick" to the remotely located surface during movements of the viewer's head, resulting in image blur or the display of so-called image artifacts. This phenomenon may occur even during relatively low-speed head movements. When NTE devices are implemented in aircraft, the devices are often used during turbulent flight conditions. For example, while landing the aircraft under stormy conditions. During these flight conditions, viewer head movements may be unavoidable.

Hence, there is a need for a NTE display system and method that at least reduces image blurring and/or image artifact display that may result from viewer movements. The present invention addresses at least this need.

BRIEF SUMMARY

In one embodiment, and by way of example only, a method of reducing artifacts in a near-to-eye (NTE) display that is worn, at least partially, on a viewer's head, includes sensing movement of the NTE display while displaying an image that comprises individual content frames on the NTE display. A characteristic of the individual content frames of the displayed image is varied based on the sensed movement.

In another exemplary embodiment, a near-to-eye (NTE) display system includes a NTE display, a sensor, and a processor. The NTE display is adapted to be disposed adjacent a viewer's head and is configured to display an image that comprises individual content frames to the viewer. The sensor is configured to sense movement of the NTE display and to supply a movement signal representative thereof. The processor is in operable communication with the NTE display and the sensor. The processor is configured to render the image on the NTE display and is responsive to the movement signal to vary a characteristic of the individual content frames.

In still another exemplary embodiment, an aircraft near-to-eye (NTE) display system includes a headset, a NTE display, a sensor, and a processor. The headset is configured to be worn on a pilot's head. The NTE display is mounted on the headset and is adapted, when the headset is on the pilot's head, to be disposed adjacent to a pilot's eye. The NTE display is configured to display an image to the pilot that comprises individual content frames. The sensor is mounted on the headset, and is configured to sense movement of the NTE display and supply a sensor signal representative thereof. The processor is in operable communication with the NTE display and the sensor. The processor is configured to render the image on the NTE display and is responsive to the sensor signal to vary a characteristic of the individual content frames.

Other desirable features and characteristics of the display system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although a particular preferred embodiment may be implemented within an aircraft environment, it will be appreciated that the described embodiments may be implemented in any one of numerous and varied vehicular and non-vehicular environments.

Figure 1:
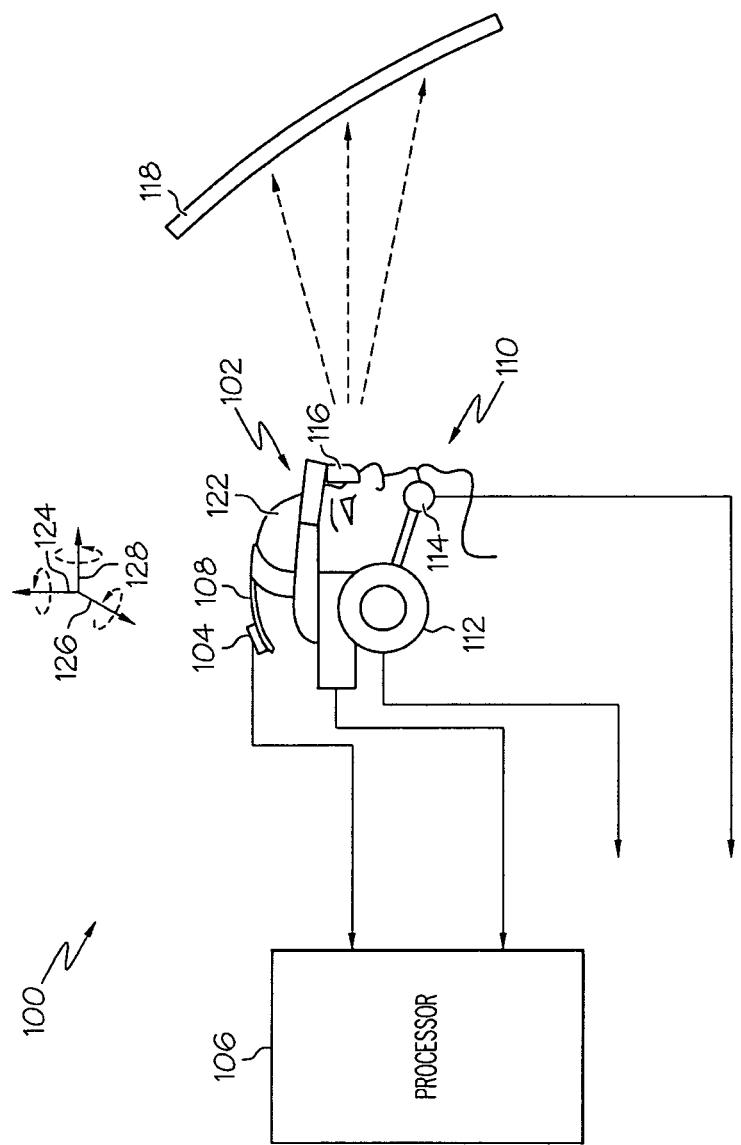
FIG. 1 is a functional block diagram of an embodiment of an exemplary near-to-eye (NTE) display system.

Turning now to FIG. 1, an exemplary display system 100 that may be used, for example, in a vehicle is depicted. It will be appreciated that the types of vehicles in which the display system 100 may be implemented may vary. For example, the display system 100 may be implemented in aircraft, spacecraft, automobiles, or numerous other terrestrial and non-terrestrial vehicles. No matter the particular end-use vehicle, the display system 100 includes at least a near-to-eye (NTE) display device 102, a sensor 104, and a processor 106.

The NTE display device 102 is preferably mounted on a headset 108. The headset 108 may be variously configured, but in the depicted embodiment the headset 108 is configured to be worn by a user (or viewer) 110, and includes one or more earphones 112 and a microphone 114. The earphones 112 are adapted to generate audio signals in response to signals received from, for example, a suitable non-illustrated interface. It will be appreciated that the non-illustrated interface may receive signals from, for example, a non-illustrated vehicle radio, the processor 106, and/or one or more other non-illustrated devices. It will additionally be appreciated that the earphones 112 may be variously implemented. For example, the earphones 112 may be implemented as active noise reduction (ANR) devices or passive devices.

The microphone 114 is adapted to detect viewer utterances or other vehicle noises and to transmit signals representative of the detected utterances or noises via, for example, a suitable non-illustrated interface. It will be appreciated that the non-illustrated interface may supply the signals to, for example, the non-illustrated vehicle radio, the processor 106, and/or one or more other non-illustrated devices. The microphone 114 may include, for example, a noise cancelling microphone or any one of numerous other suitable devices. In some embodiments, headset 108 may also include a non-illustrated push-to-talk (PTT) switch which, when depressed, causes the non-illustrated vehicle radio to transmit pilot utterances detected by the microphone 114 over the air. In other embodiments, a PTT switch may be disposed at a location remote from the headset 108.

The NTE display device 102, as noted above, is preferably mounted on the headset 108, and may include a monocular or binocular set of displays 116. Although the configuration of the displays 116 may vary, in one embodiment each display 116 includes a transparent display panel (e.g., a liquid crystal on silicon display), a light source (e.g., light emitting diodes), one or more prisms adapted to deflect light generated by the light source, one or more polarizers, and one or more lenses. With this configuration, the NTE display device 102 may display one or more virtual images to the viewer 110. That is, the one or more displayed images appear to the viewer 110 to overlie (or otherwise be disposed in proximity to) another surface, such as a vehicle windshield 118, and/or one or more non-illustrated vehicle instruments, and/or one or more non-illustrated vehicle control components. It is noted that in some embodiments the NTE display device 102 may be adjustably mounted on the headset 108. By adjustably mounting the NTE display device 102 on the headset 108, the NTE display device 102 it may be moved into and out of the field of view of the viewer 110.

The sensor 104 is preferably mounted on the headset 108 and is configured to sense movements of at least the display device 102. More specifically, the sensor 104 is configured to sense movement of the display device 102, and to supply a signal representative of the sensed movement to the processor 106. In one particular embodiment, the sensor 104 is configured to sense, either directly or indirectly (e.g., derived from sensed position), at least a movement rate of the display device 102 by sensing movement rate of the viewer's head 122, and to supply a signal representative of the sensed movement to the processor 106. In any case, the movement that the sensor 104 senses preferably includes both translational movements and angular movements. The sensor 104 may also be configured, at least in some embodiments, to sense the position and orientation of the display device 102 and/or the viewer's head 122.

The viewer head position may be represented, for example, in terms of offsets from a static, default point in the vehicle. The viewer head orientation may be represented, for example, in terms of angles of rotation about a set of orthogonal reference axes (e.g., axes 124, 126, 128). For example, viewer head movements to the left or right may be represented in terms of angular rotation about axis 124, viewer head movements up or down (e.g., nods) may be represented in terms of angular rotation about axis 126, and viewer head tilts to the left or right may be represented in terms of angular rotation about axis 128. It will be appreciated that although FIG. 1 depicts the sensor 104 as a single sensing device, the sensor 104 may be implemented, if needed or desired, as a plurality of sensing devices. Moreover, the particular type and configuration of the sensor 104 may vary, and may be implemented as any one of numerous suitable devices including, for example, an inertial movement unit (IMU), an inertial navigation unit (INU), one or more magnetometers, or auxiliary cameras locking on reference signals, just to name a few.

The NTE display device 102 and the sensor 104 are both in operable communication with the processor 106. The processor 106 may be implemented as one or more processors and/or other suitable electronic components, and may be configured to implement one or multiple functions. At least one function that the processor 106 implements is a display generator that renders one or more images on the NTE display device 102. The processor 106 may render the one or more images on the NTE display device 102 in response to various signals it receives from one or more non-illustrated external systems, subsystems, devices, or components. It will be appreciated that the processor 106 may be mounted on the headset 108, or it may be disposed remote from the headset 108 and form part of one or more other non-illustrated systems.

No matter its specific location, the processor 106 is additionally responsive to the sensor signal supplied from the sensor 104 to selectively vary one or more display characteristics of the rendered image(s). As is generally known, the images are rendered on the NTE display device 102 comprise individual content frames that are successively and rapidly rendered by the processor 106. Thus, more specifically, the processor 106, in response to the sensor signal supplied from the sensor 104, varies one or more characteristics of the individual content frames. The one or more characteristics of the individual content frames that may be varied include, among other characteristics, the brightness, the frequency content, or both. As will now be described, varying each of these individual characteristics (e.g., brightness and frequency content) in response to the sensor signal at least reduces the previously mentioned image streaking or multiple images seen by the viewer 110 that may result from viewer head movements.

In one embodiment, the processor 106 is responsive to the sensor signal to vary the intensity (or brightness) of individual content frames of a displayed image. Preferably, the processor 106 is configured to vary the brightness of individual content frames inversely with the sensed movement of the display device 102. Thus, when the sensor 104 senses relatively rapid translational and/or angular movement of the display device 102, the processor 106 will decrease the brightness (relative to the brightness associated with slower or no movement) of the individual content frames. Conversely, when the sensor 104 senses relatively slow translational and/or angular movement of the viewer's head 122, the processor 106 will increase the brightness (relative to the brightness associated with more rapid movements) of the individual content frames. An example of this particular embodiment is illustrated more clearly in FIGS. 2 and 3, and will now be described.

Figure 2:
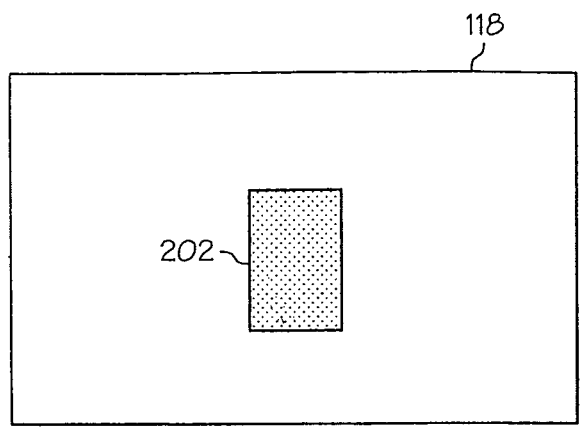
FIG. 2 depicts an exemplary virtual image that may be rendered by the exemplary system of FIG. 1 during little or no head movement of a viewer.
Figure 3:
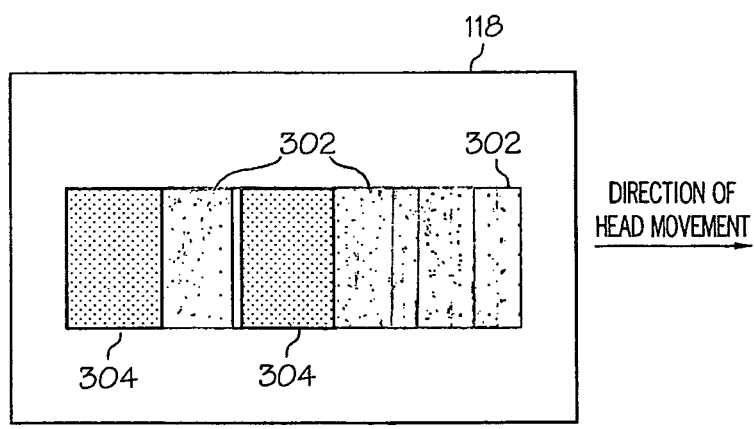
FIG. 3 depicts the exemplary virtual image of FIG. 2 that may be rendered by the exemplary system of FIG. 1 during relatively slow and relatively rapid head movement of a viewer.

Referring first to FIG. 2, a virtual image 202 is depicted as being displayed at a position on, for example, the vehicle windshield 118 when the sensor 104 senses very little or no head movement. The manner in which the processor 106 causes the virtual image 202 to be rendered in response to head movements is depicted in FIG. 3. As FIG. 3 illustrates, relatively dimmer (yet still visible) individual content frames 302 are rendered during relatively rapid viewer head movements, whereas relatively brighter individual content frames 302 are rendered during relatively slow (or no) viewer head movements. Because human eyes are integrative devices, individual content frames associated with relatively slower head movements are emphasized and are thus more readable. Conversely, individual content frames associated with relatively rapid head movements, and which contribute mostly to blur, are deemphasized. Although FIG. 3 is representative of sensed head movements to the right, it will be appreciated that it is illustrative of head movements in other directions.

In another embodiment, the processor 106 is responsive to the sensor signal to vary the frequency content, and more particularly the two-dimensional (2D) frequency content, of individual content frames of a displayed image. In this embodiment, the processor 106 implements a 2D image filter, such as a 2D low-pass filter, that has at least one variable cut-off frequency. Preferably, the processor 106 is configured to vary one or more cut-off frequencies of the 2D low-pass filter inversely with the sensed movement rate of the viewer's head 122. Thus, when the sensor 104 senses relatively rapid translational and/or angular movement rates of the viewer's head 122, the processor 106 will decrease one or more cut-off frequencies of the 2D filter. As a result, relatively higher frequency components of the image content frames are attenuated, and only relatively lower frequency components of the image content frames are rendered. Conversely, when the sensor 104 senses relatively slow translational and/or angular movement rates of the viewer's head 122, the processor 106 will increase one or more cut-off frequencies of the 2D filter. As a result, the higher frequency components of the individual content frames are rendered. An example of this particular embodiment is illustrated more clearly in FIGS. 4 and 5, and will now be described.

Figure 4:
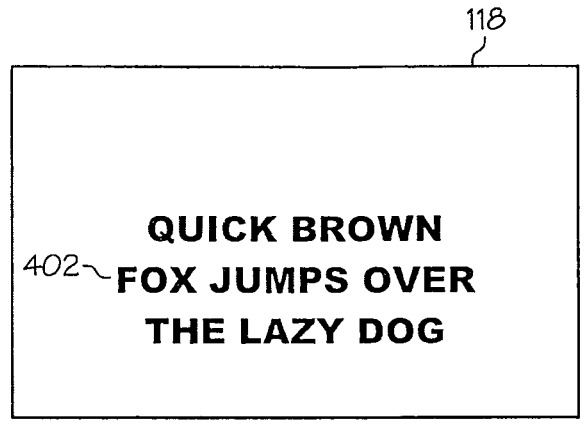
FIG. 4 depicts another exemplary virtual image that may be rendered by the exemplary system of FIG. 1 during little or no head movement of a viewer.
Figure 5:
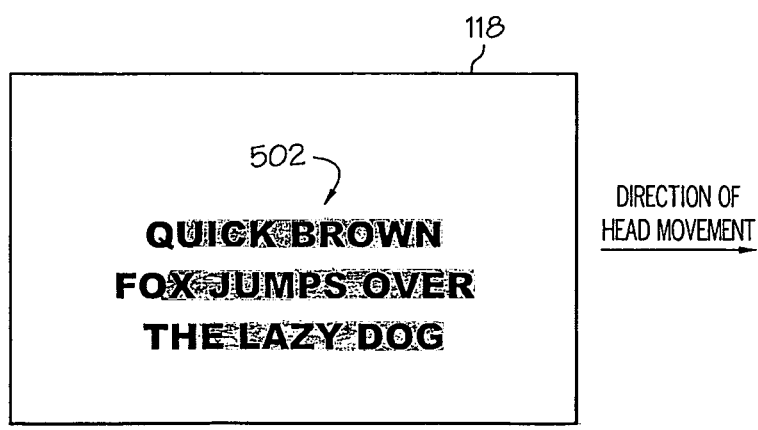
FIG. 5 depicts the exemplary virtual image virtual image of FIG. 4 that may be rendered by the exemplary system of FIG. 1 during relatively slow and relatively rapid head movement of a viewer.

Referring first to FIG. 4, a virtual image 402 (in this case, text) is depicted as being displayed at a position on, for example, the vehicle windshield 118 when the sensor 104 senses very little or no head movement. The manner in which the processor 106 causes the virtual image 202 to be rendered in response to head movements is depicted in FIG. 5. As FIG. 5 illustrates, only relatively low frequency components of individual content frames 502 are rendered during relatively rapid viewer head movements, whereas more of the relatively high frequency components of individual content frames 502 are rendered during relatively slow (or no) viewer head movements. Because human eyes contain specialized, high sensitivity edge detection doughnut cells, the displayed image 402 will be more readable during viewer head movements. As with FIG. 3, although FIG. 5 is representative of sensed head movements to the right, it will be appreciated that it is illustrative of head movements in other directions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of reducing display artifacts in a near-to-eye (NTE) display that is worn, at least partially, on a viewer's head, comprising the steps of:
   receiving one or more signals;
   successively rendering, in response to the one or more signals, an image comprising successive individual content frames to be displayed on the NTE display;
   sensing a movement rate of the NTE display while displaying an image on the NTE display; and
   varying an individual content frame in the successively rendered image of successive individual content frames based on the sensed movement rate,
   wherein the varying of the individual content frame comprises
      varying content of the individual content frame by implementing a two-dimensional (2D) image filter and varying the 2D image filter based on the sensed movement rate of the NTE display.

2. The method of claim 1, further comprising:
   decreasing a brightness if the sensed movement increases; and
   increasing the brightness if the sensed movement decreases.

3. The method of claim 1, wherein the step of varying the 2D image filter comprises varying at least one cut-off frequency of a 2D low-pass filter.

4. The method of claim 3, further comprising:
   varying the at least one cut-off frequency inversely with the sensed movement.

5. The method of claim 4, further comprising:
   decreasing the at least one cut-off frequency if the sensed movement increases; and
   increasing the at least one cut-off frequency if the sensed movement decreases.

6. A near-to-eye (NTE) display system, comprising:
   a NTE display adapted to be disposed adjacent to a viewer's head and to receive one or more signals, the NTE display configured, in response to the one or more signals, to successively render an image comprising successive individual content frames to be displayed on the NTE display to the viewer, the displayed image comprising individual content frames;
   a sensor configured to sense movement rate of the NTE display and supply a sensor signal representative thereof; and
   a processor in operable communication with the NTE display and the sensor, the processor configured to render the image on the NTE display and responsive to the sensor signal to vary an individual content frame in the successively rendered image of successive individual content frames based on the sensed movement rate,
   wherein the varying of the individual content frame comprises
      varying content of the individual content frame by implementing a two-dimensional (2D) image filter and varying the 2D image filter based on the sensed movement rate of the NTE display.

7. The system of claim 6, wherein the processor is further responsive to the sensor signal to:
   decrease a brightness of the individual content frames if the sensed movement increases; and increase the brightness of the individual content frames if the sensed movement decreases.

8. The system of claim 6, wherein:
the 2D image filter is a 2D low-pass filter having at least one cut-off frequency; and
the processor is further responsive to the sensor signal to vary the at least one cut-off frequency of the 2D low-pass filter.

9. The system of claim 8, wherein the processor is further responsive to the sensor signal to vary the at least one cut-off frequency inversely with the sensed movement.

10. The system of claim 9, wherein the processor is further responsive to the sensor signal to:
decrease the at least one cut-off frequency if the sensed movement increases; and
increase the at least one cut-off frequency if the sensed movement decreases.

* * * * *